No. 619,208. Patented Feb. 7, 1899.

J. McLACHLAN.

STONE CUTTING MACHINE.

(Application filed Feb. 23, 1898.)

(No Model.) 3 Sheets—Sheet 1.

Witnesses
G. J. Gollaudet.
Edith Himsworth

Inventor
John Mc Lachlan.
By his Attorney

THE NORRIS PETERS CO., PHOTO-LITHO., WASHINGTON, D. C.

No. 619,208. Patented Feb. 7, 1899.

J. McLACHLAN.

STONE CUTTING MACHINE.

(Application filed Feb. 23, 1898.)

(No Model.) 3 Sheets—Sheet 2.

Witnesses

Edith Himsworth.

By his Attorney

Inventor

John Mc. Lachlan.

No. 619,208. Patented Feb. 7, 1899.
J. McLACHLAN.
STONE CUTTING MACHINE.
(Application filed Feb. 23, 1898.)
(No Model.) 3 Sheets—Sheet 3.
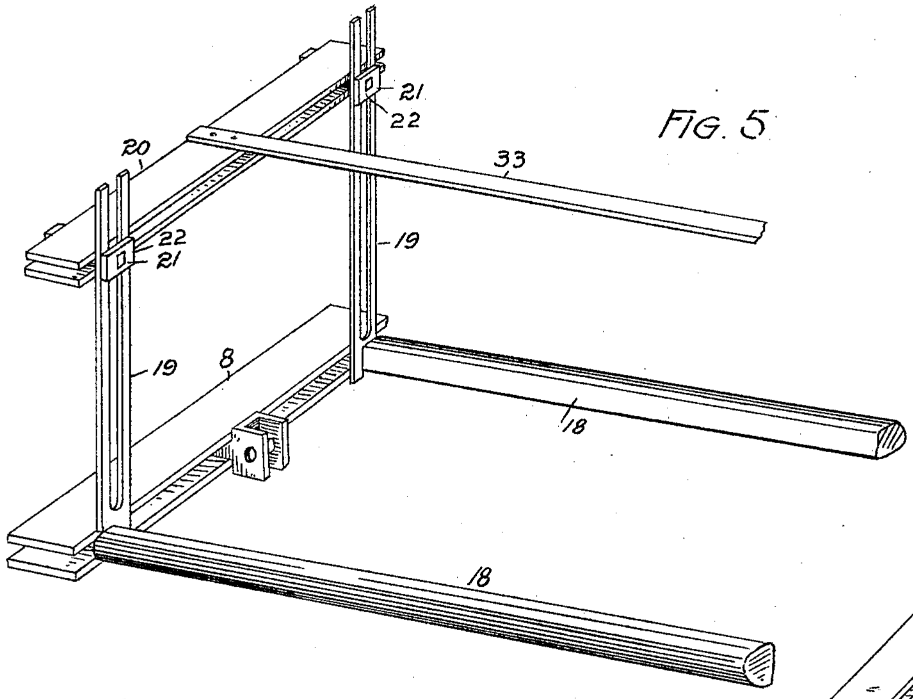
FIG. 5
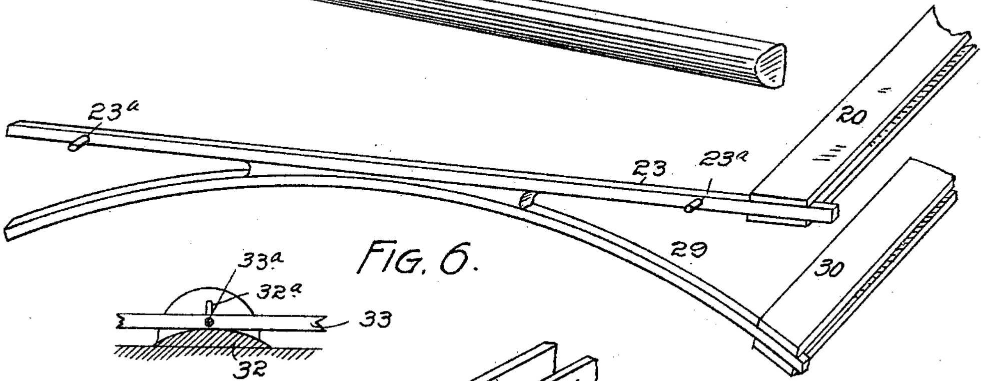
FIG. 6.
FIG. 9
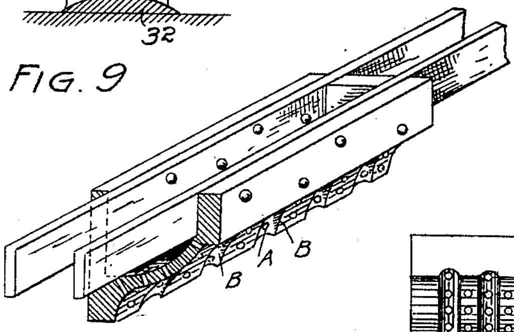
FIG. 7.
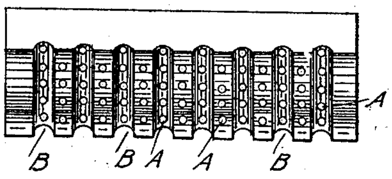
FIG. 8.
Witnesses
G. J. O'Connell.
Edith Himsworth.
Inventor
John Mc. Lachlan
By his Attorney [signature]
THE NORRIS PETERS CO., PHOTO-LITHO., WASHINGTON, D. C.

UNITED STATES PATENT OFFICE.

JOHN McLACHLAN, OF DENVER, COLORADO.

STONE-CUTTING MACHINE.

SPECIFICATION forming part of Letters Patent No. 619,208, dated February 7, 1899.

Application filed February 23, 1898. Serial No. 671,225. (No model.)

*To all whom it may concern:*

Be it known that I, JOHN MCLACHLAN, a citizen of the United States of America, residing at Denver, in the county of Arapahoe and State of Colorado, have invented certain new and useful Improvements in Stone-Cutting Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in stone-cutting machines, and comprises a combination of stone-sawing and stone-molding mechanism, whereby the stone may be sawed and a molding either straight or circular simultaneously formed thereon. The molding devices are preferably located above the saws, whereby the necessary abrading material may drop from the molding-cutters into the kerfs or grooves formed by the saws.

The invention also includes mechanism for the independent vertical adjustment of the frames upon which the saws and molding-cutters are respectively mounted.

To these ends the invention consists of the features, arrangements, and combinations hereinafter described and claimed, all of which will be fully understood by reference to the accompanying drawings, in which is illustrated an embodiment thereof.

Figure 1:
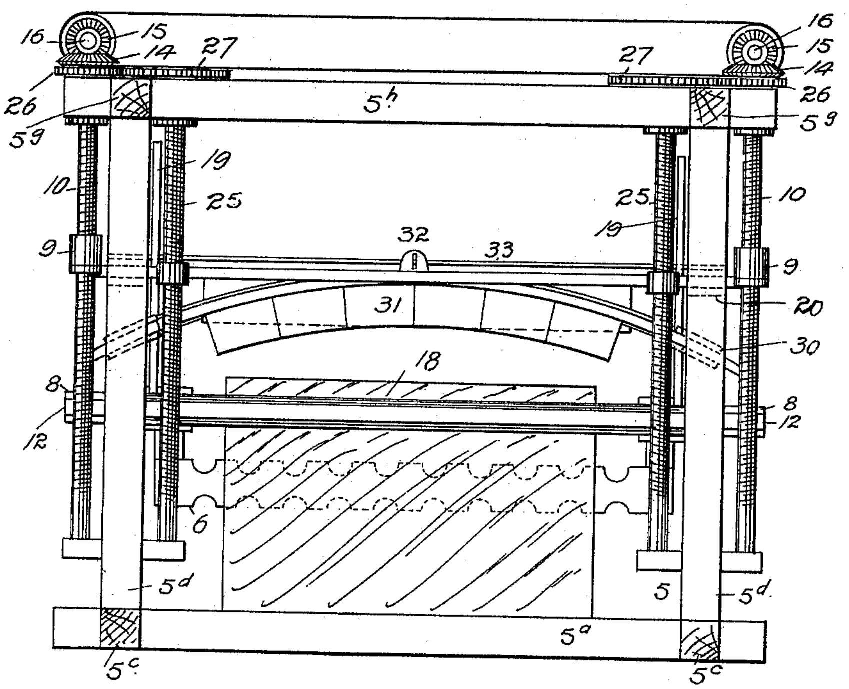
Figure 10:
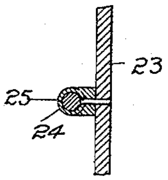
Figure 2:
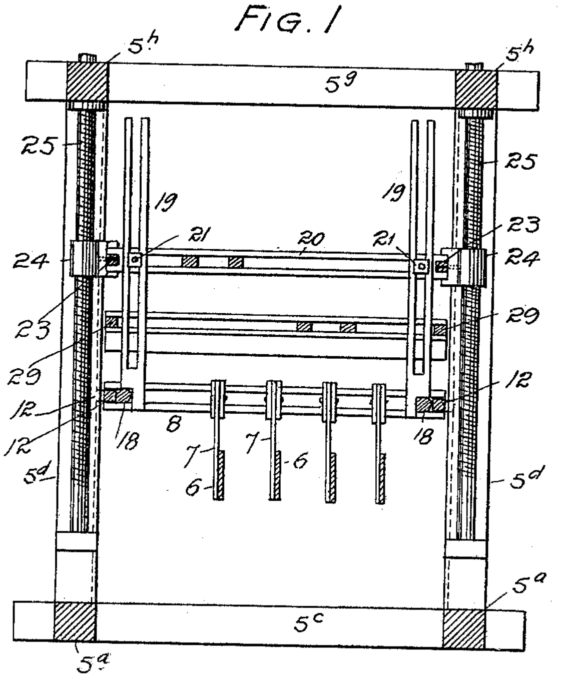
Figure 11:
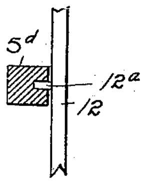
Figure 4:
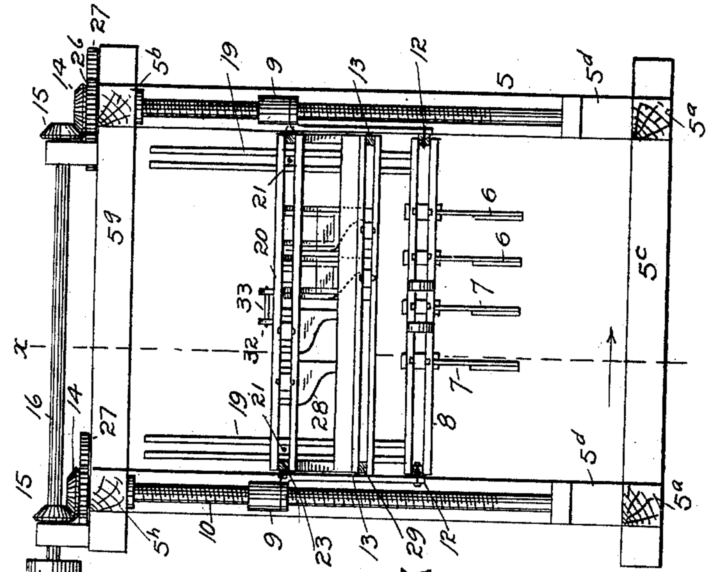
Figure 3:
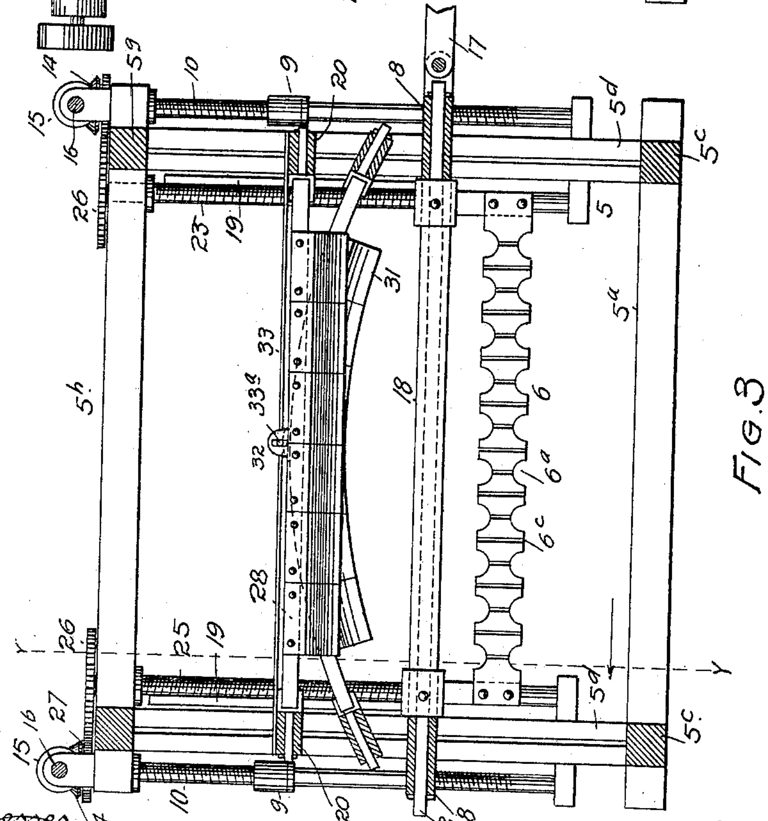

In the drawings, Figure 1 is a side elevation of my improved machine. Fig. 2 is a section taken on the line *y y*, Fig. 3. Fig. 3 is a vertical longitudinal section taken on the line *x x*, Fig. 4. Fig. 4 is an end elevation of the machine. Fig. 5 is a fragmentary perspective view of the movable frames upon which the saws and mold-cutters are mounted. Fig. 6 is a fragmentary perspective view of the guides engaging the cross-heads of both the straight and circular mold cutters. Fig. 7 is a perspective view of the mold-cutter and the supporting-bar to which it is attached. Fig. 8 is a front view of the mold-cutter. Figs. 9, 10, and 11 illustrate details of construction.

Similar reference characters indicating corresponding parts in these views, let the numeral 5 designate the stationary frame, composed of the side base-beams $5^a$, the end base-beams $5^c$, the vertical posts $5^d$, the top end beams $5^g$, and the top side beams $5^h$. The saws 6 are mounted on hangers 7, attached to a horizontal cross-head 8, mounted on longitudinal guides 12, having projections $12^a$ engaging vertical grooves formed in the posts $5^d$. The guides are vertically adjustable by means of nuts 9, mounted on vertical screws 10, journaled in the stationary frame. To the nuts 9 are attached depending bars 13, whose lower extremities are secured to the guides 12. To the upper extremities of the screws 10 are made fast bevel-gears 14, engaging other similar gears 15, fast on a horizontal shaft 16. The saws are operated by means of a pitman 17, attached to one of the cross-heads 8 and connected with any suitable motor, whereby a reciprocating movement may be imparted to the gang of saws. The saws 6 are provided with circular recesses $6^a$, formed in their upper and lower edges, and with vertical grooves $6^c$ to allow the abrading material falling into the grooves from above to pass downward where the lower edges of the saw-blades can act thereon in the performance of their functions.

The two cross-heads 8 are rigidly connected by longitudinal bars 18. To the inner edges of the cross-heads 8 of the saw-frame are attached four upright vertically-slotted guides 19, one being located at each corner of the machine. To these guides 19 are movably attached two upper cross-heads 20 by means of keys 21, which pass through the slots of guides. To the inner extremities of these keys are attached stop-blocks 22, which hold the keys in place. During the operation of the machine the cross-heads 20 have a free vertical movement on the guides 19. These cross-heads 20 are mounted on longitudinal guides 23, secured to nuts 24, through which pass vertical adjusting feed-screws 25, journaled in the frame. The guides 23 are provided with projections $23^a$, which engage vertical grooves formed in the posts $5^d$ of the frame. To the upper extremities of the screws 25 are made fast gears 27, meshing with gears 26, made fast to the feed-screws 10 just below the bevel-gears 14.

The straight-mold cutters 28 are secured to the cross-heads 20. To the straight guides 23 are attached curved guides 29, engaged by cross-heads 30, to which are attached the circle-mold cutters 31, curved to conform to an arc of any desired radius. To the convex center of the circle-mold cutters is attached a shoe 32, whose upper portion is grooved to received a straight bar 33, whose extremities are rigidly attached to the cross-heads 20. This bar is provided with two lateral projections or trunnions $33^a$, which engage vertical slots $32^a$, formed in the shoe 32. This construction permits the circle-mold cutters and their cross-heads 30 to reciprocate in a curve defined by the guides 29, while the saws and the straight-mold cutters, together with their respective cross-heads 8 and 20, reciprocate in horizontal planes defined by the guides 12 and 23.

The mold-cutters, whether straight or circular, are formed in sections suitably connected. They are hollow (see Fig. 7) to receive the abrading material, which escapes by way of orifices A, formed in the mold-cutting wall and communicating with grooves B, formed in the stone-cutting surface, which is fashioned to conform to any desired molding design. The mold-cutters, as heretofore explained, are arranged above the saws and so located that the abrading material after being utilized by the said cutters may fall into the channels or kerfs formed by the saws and pass thence by way of the vertical grooves $6^c$ to the bottom of the kerfs, where the said material is again utilized by the saws.

From the construction heretofore explained the operation of my improved stone-cutting apparatus will be readily understood. Power being applied to the pitman 13, the cross-heads 8, 20, and 30, together with the saws and the mold-cutters, both straight and circular, are reciprocated by virtue of the construction and arrangement of the parts heretofore described. The vertical adjustment of the guides 12, 23, and 29 is effected through the instrumentality of the feed-screws 10 and 25, which are actuated by transmitting power from any suitable motor to a pulley 35, fast on one of the shafts 16. The two shafts 16 are each provided with a pulley 36, the two pulleys being connected by a belt 37. The saws are supposed to travel faster than the mold-cutters. Hence the gears 27, fast on the screws 25, are larger than the gears 26, fast on the screws 10, which effect the vertical adjustment of the saw-guides 12. The mold-cutters are allowed a vertical movement independently of the saws by virtue of the vertical guides 19, through which are passed the keys 21 of the cross-heads 20.

In using the circle-mold cutters when the rock is thick there will be ample time to grind off the corners, when the surface of the rock is flat, before the saws will have traveled through the body of the rock. If desired, however, the corners of the block of stone may be chipped or broken off before the stone is subjected to the action of the machine to facilitate the work of forming the circle-molding.

Having thus described my invention, what I claim is—

1. In a stone-cutting machine, the combination of a stationary frame, a vertically-adjustable reciprocating frame mounted thereon, saws attached to the last-named frame, another vertically-adjustable reciprocating frame also mounted on the stationary frame, mold-cutters attached to the last-named frame, and a suitable connection between the saw-frame and the mold-cutter frame, whereby the two frames are reciprocated together, but vertically adjustable independently of each other.

2. In a stone-cutting machine, the combination of a stationary frame, a vertically-adjustable reciprocating frame mounted thereon, saws attached to said frame, another vertically-adjustable reciprocating frame mounted on the stationary frame above the saw-frame, mold-cutters attached to the uppermost frame and so arranged that the abrading material may fall from the mold-cutters to the saws, and a suitable connection between the saw-frame and the mold-cutter frame whereby the two frames are reciprocated together, but vertically adjustable independently of each other.

3. In a stone-cutting machine, the combination with a stationary frame, of guides vertically adjustable thereon, reciprocating cross-heads mounted on the guides, saws attached to the cross-heads, other vertically-adjustable guides also mounted on the stationary frame, reciprocating cross-heads mounted on said last-named guides, mold-cutters attached to the cross-heads, and vertically-slotted guides connecting the saw cross-heads with the mold-cutter cross-heads, whereby the saws and mold-cutters are reciprocated in unison, but adjustable independently of each other.

4. In a stone-cutting machine, the combination with a suitable stationary frame, of guides vertically adjustable thereon, reciprocating cross-heads mounted on the guides, saws attached to the cross-heads, other vertically-adjustable guides also mounted on the stationary frame, reciprocating cross-heads mounted on the said last-named guides, mold-cutters attached to the cross-heads, vertically-slotted guides connecting the saw cross-heads with the mold-cutter cross-heads, whereby the saws and mold-cutters are reciprocated in unison, but vertically adjustable independently of each other, feed-screws connected with the saw-frame guides, other similar screws connected with the mold-cutter-frame guides, and a suitable connection between the two sets of screws, whereby they may be simultaneously operated.

5. In a stone-cutting machine, the combination with a suitable stationary frame, of guides vertically adjustable thereon, reciprocating cross-heads mounted on the guides, saws attached to the cross-heads, other vertically-adjustable guides also mounted on the stationary frame, reciprocating cross-heads mounted on the said last-named guides, mold-cutters attached to the cross-heads, vertically-slotted guides connecting the saw cross-heads with the mold-cutter cross-heads, whereby the saws and mold-cutters are reciprocated in unison, but vertically adjustable independently of each other, feed-screws connected with the saw-frame guides, other similar screws connected with the mold-cutter-frame guides, and a suitable connection between the two sets of screws, whereby they may be simultaneously operated at different speeds, the screws for adjusting the saw-frame moving the faster.

6. The combination with a suitable stationary frame, of vertically-adjustable straight guides mounted thereon, cross-heads mounted on said guides, curved guides vertically movable on the frame and arranged to reciprocate in unison with the straight guides, cross-heads engaging the curved guides, a circle-mold cutter attached to the last-named cross-heads, a shoe fast on the convex surface of the mold-cutter, a bar rigidly attached to the cross-heads mounted on the straight guides and connected with the shoe of the circle-mold cutter, in such a manner as to allow the bar to move in a straight line, while the mold-cutter reciprocates in a curve.

7. The combination with a suitable stationary frame, of vertically-adjustable straight guides mounted thereon, cross-heads mounted on the said guides, curved guides vertically movable on the frame and arranged to move in unison with the straight guides, cross-heads engaging the curved guides, a circle-molding cutter attached to the last-named cross-heads and arranged to operate in a vertical plane, a shoe fast on the convex surface of the mold-cutter, said shoe being grooved and provided with vertical slots, a bar rigidly attached to the cross-heads mounted on the straight guides and engaging the grooves in the shoe, the bar being provided with lateral projections or trunnions engaging the vertical slots in the shoe.

8. In a stone-cutting-machine, the combination with a stationary frame, of the vertically-adjustable straight and curved guides mounted thereon, cross-heads mounted on each set of guides, straight and circle mold cutters mounted on the respective straight and curved guides, a bar attached to the cross-heads of the straight cutters, and a suitable connection between said bar and the circle-mold cutters, whereby the straight and circle mold cutters reciprocate in unison, while each performs its proper function.

9. The combination with the stationary frame, of the vertically-adjustable reciprocating frame mounted thereon, saws attached to this frame, a vertically-adjustable reciprocating circle-mold-cutter frame also mounted on the stationary frame and adapted to travel in the arc of a circle, and a suitable connection between the saw-frame and the mold-cutter frame, whereby the two frames are adapted to reciprocate in unison, but are independently adjustable vertically.

10. The combination with the stationary frame, of a reciprocating saw-frame, saws attached to said frame, a reciprocating circle-mold-cutter frame, circle-mold cutters attached to said frame, the said saw and mold-cutter frames being mounted on the stationary frame, and a suitable connection between the saw-frame and the mold-cutter frame, whereby the two frames reciprocate in unison.

11. The combination with the stationary frame, of a reciprocating saw-frame, saws attached to said frame, a reciprocating straight-mold-cutter frame, straight-mold cutters mounted thereon, a reciprocating circle-mold-cutter frame, circle-mold cutters attached to said frame, the said saw and mold-cutter frames being mounted on the stationary frame, and a suitable connection between the saw-frame and the mold-cutter frames whereby all of the said frames reciprocate in unison.

In testimony whereof I affix my signature in presence of two witnesses.

JOHN McLACHLAN.

Witnesses:

G. J. ROLLANDET,

EDITH HIMSWORTH.